(12) United States Patent
Ozgur

(10) Patent No.: US 9,398,498 B2
(45) Date of Patent: Jul. 19, 2016

(54) IMS BASED P2P STREAMING AND DOWNLOAD SERVICES

(71) Applicant: INTEL CORPORATION, Santa Clara, CA (US)

(72) Inventor: Oyman Ozgur, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 9 days.

(21) Appl. No.: 14/041,363

(22) Filed: Sep. 30, 2013

(65) Prior Publication Data

US 2014/0095730 A1    Apr. 3, 2014

Related U.S. Application Data

(60) Provisional application No. 61/707,784, filed on Sep. 28, 2012.

(51) Int. Cl.
*H04W 36/00* (2009.01)
*H04W 72/04* (2009.01)
(Continued)

(52) U.S. Cl.
CPC ......... *H04W 36/0061* (2013.01); *H04B 17/318* (2015.01); *H04L 1/1812* (2013.01); *H04L 5/0035* (2013.01); *H04L 5/0055* (2013.01);
(Continued)

(58) Field of Classification Search
CPC .. H04W 72/005; H04W 80/10; H04L 65/608; H04L 65/60; H04L 65/1016; H04L 65/601
USPC .................. 370/312, 252; 709/231, 203, 229
See application file for complete search history.

(56) References Cited

U.S. PATENT DOCUMENTS

2008/0109853 A1    5/2008  Einarsson et al.
2009/0005056 A1    1/2009  Gonsa et al.
(Continued)

FOREIGN PATENT DOCUMENTS

JP          2012/523158 A     9/2012
WO     WO 2007/101473 A1     9/2007
(Continued)

OTHER PUBLICATIONS

TS 26.237 V10.2.0, IP Multimedia Subsystem (IMS) based Packet Switch Streaming (PSS) and Multimedia Broadcast/Multicast Service (MBMS) User Service Protocols, Jun. 2011.*
(Continued)

*Primary Examiner* — Un C Cho
*Assistant Examiner* — Oussama Roudani
(74) *Attorney, Agent, or Firm* — Thorpe North & Western LLP

(57) ABSTRACT

Technology to provide P2P switching between HTTP based delivery of DASH formatted content to an MBMS download is disclosed. In an example, a host UE can include computer circuitry configured to: receive a session initiation protocol (SIP) termination message, from a service control function (SCF) module to terminate an SIP session for delivery of DASH based content to a mobile device; send a SIP acknowledgement message to the SCF to be forwarded to the mobile device; and establish a FLUTE protocol based MBMS download session between the mobile device and a BMSC.UPF module operating on the host mobile device for the MBMS download. Technology is also disclosed for P2P MBMS download via BMSC and file repair via an HTTP server using the switching.

18 Claims, 11 Drawing Sheets

(51) Int. Cl.

| | | |
|---|---|---|
| *H04W 72/12* | (2009.01) | |
| *H04W 74/00* | (2009.01) | |
| *H04L 5/00* | (2006.01) | |
| *H04W 48/14* | (2009.01) | |
| *H04W 72/02* | (2009.01) | |
| *H04W 76/02* | (2009.01) | |
| *H04W 88/02* | (2009.01) | |
| *H04L 1/18* | (2006.01) | |
| *H04B 17/318* | (2015.01) | |
| *H04W 24/10* | (2009.01) | |
| *H04W 76/04* | (2009.01) | |
| *H04W 4/00* | (2009.01) | |
| *H04W 24/08* | (2009.01) | |
| *H04W 28/02* | (2009.01) | |
| *H04W 40/24* | (2009.01) | |
| *H04W 48/16* | (2009.01) | |
| *H04W 52/02* | (2009.01) | |
| *H04W 52/04* | (2009.01) | |
| *H04W 52/14* | (2009.01) | |
| *H04W 72/00* | (2009.01) | |
| *H04W 80/10* | (2009.01) | |
| *H04W 36/08* | (2009.01) | |
| *H04W 48/18* | (2009.01) | |

(52) U.S. Cl.
CPC .............. *H04W 4/005* (2013.01); *H04W 24/08* (2013.01); *H04W 24/10* (2013.01); *H04W 28/0221* (2013.01); *H04W 36/0088* (2013.01); *H04W 40/246* (2013.01); *H04W 48/14* (2013.01); *H04W 48/16* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/1284* (2013.01); *H04W 74/002* (2013.01); *H04W 74/004* (2013.01); *H04W 76/025* (2013.01); *H04W 76/043* (2013.01); *H04W 76/046* (2013.01); *H04W 76/048* (2013.01); *H04W 88/02* (2013.01); *H04W 36/08* (2013.01); *H04W 48/18* (2013.01); *H04W 52/0261* (2013.01); *H04W 72/005* (2013.01); *H04W 80/10* (2013.01); *Y02B 60/50* (2013.01)

(56) References Cited

U.S. PATENT DOCUMENTS

| | | |
|---|---|---|
| 2009/0316615 A1* | 12/2009 | Vedantham et al. .......... 370/312 |
| 2010/0142517 A1 | 6/2010 | Montemurro et al. |
| 2010/0211689 A1 | 8/2010 | Bijwaard et al. |
| 2012/0110120 A1 | 5/2012 | Willig et al. |
| 2013/0021998 A1 | 1/2013 | Shatsky |
| 2013/0291040 A1 | 10/2013 | Rhyu et al. |
| 2014/0173677 A1* | 6/2014 | Lohmar et al. ................ 725/116 |

FOREIGN PATENT DOCUMENTS

| | | | |
|---|---|---|---|
| WO | WO 2010/094322 A1 | 8/2010 | |
| WO | WO 2010/114475 A2 | 10/2010 | |
| WO | WO 2013/019267 A1 | 2/2013 | |
| WO | WO 2013/022470 A1 | 2/2013 | |
| WO | WO 2013/112479 A1 | 8/2013 | |

OTHER PUBLICATIONS

TS 26.346 V11.1.0, Multimedia Broadcast/Multicast Service (MBMS); Protocols and codecs, Jun. 2012.*

3rd Generation Partnership Project; Technical Specification Group Services and System Aspects; Transparent end-to-end Packet-switched Streaming Service (PSS); Protocols and codecs (Release 9) 3GPP TS 26.234 V9.9.0 (Jun. 2012) 188 pages.

3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 11) 3GPP TS 26.237 V11.0.0 (Jun. 2012) 142 pages.

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11) 3GPP TS 26.247 V11.0.0 (Sep. 2012), 112 pages.

3rd Generation Partnership Project; Technical Specification Group Services and System Aspects; Multimedia Broadcast/Multicast Service (MBMS); Protocols and codecs (Release 9) 3GPP TS 26.346 V9.8.0 (Sep. 2012), 154 pages.

3rd Generation Partnership Project; Technical Specification Group Services and System Aspects; Study on IMS based peer-to-peer content distribution services (Release 11), 3GPP TR 22.906 V11.0.0 (Jun. 2010), 15 pages.

ISO/IEC JTC 1/SC 29, "Information Technology-Dynamic Adaptive Streaming Over HTTPP (Dash)-Part 1: Media Presentation Description and Segment Formats", ISO/IEC 23009-1:2012(E), Jan. 2012, pp. 133, Geneva.

PCT Patent Application No. PCT/US11/65586 filed Dec. 16, 2011, Ozgur Oyman.

U.S. Appl. No. 13/613,902, filed Sep. 13, 2012, Ozgur Oyman.

Intel Corp Ltd, "Discussion Paper on Combining MBMS Download and HTTP-based Delivery of Dash Content", 3GPP TSG-SA4 S4-110946, Nov. 2011, Meeting 66, Agenda 7, 5 pages, Jeju, Korea.

Intel Corp Ltd, "Discussion Paper on Procedures for MBMS File Repair via Conventional HTTP Servers in IMS Networks", 3GPP TSG-SA4 S4-120097, Jan./Feb. 2012, Meeting 67, Agenda 7, 4 pages, Edinburgh, UK.

\* cited by examiner

IMS BASED P2P STREAMING AND DOWNLOAD SERVICES

RELATED APPLICATIONS

This application claims the benefit of and hereby incorporates by reference U.S. Provisional Patent Application Ser. No. 61/707,784, filed Sep. 28, 2012.

BACKGROUND

Wireless mobile communication technology uses various standards and protocols to transmit data between a transmission station and a wireless mobile device. Some wireless devices communicate using orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). A downlink (DL) transmission can be a communication from the transmission station (or eNodeB) to the wireless mobile device (or UE), and an uplink (UL) transmission can be a communication from the wireless mobile device to the transmission station.

In a downlink transmission, the transmission station can communicate with a single wireless mobile device with a unicast subframe using a unicast service. A unicast delivery can have a one-to-one relationship, referring to one message to one mobile device. Alternatively, the transmission station can communicate with a plurality of wireless mobile devices with a multicast\broadcast single-frequency network (MB-SFN) subframe using a multimedia broadcast multicast service (MBMS). The transport multicast and broadcast traffic in a MBMS can have a one-to-many relationship, referring to one message to many mobile devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
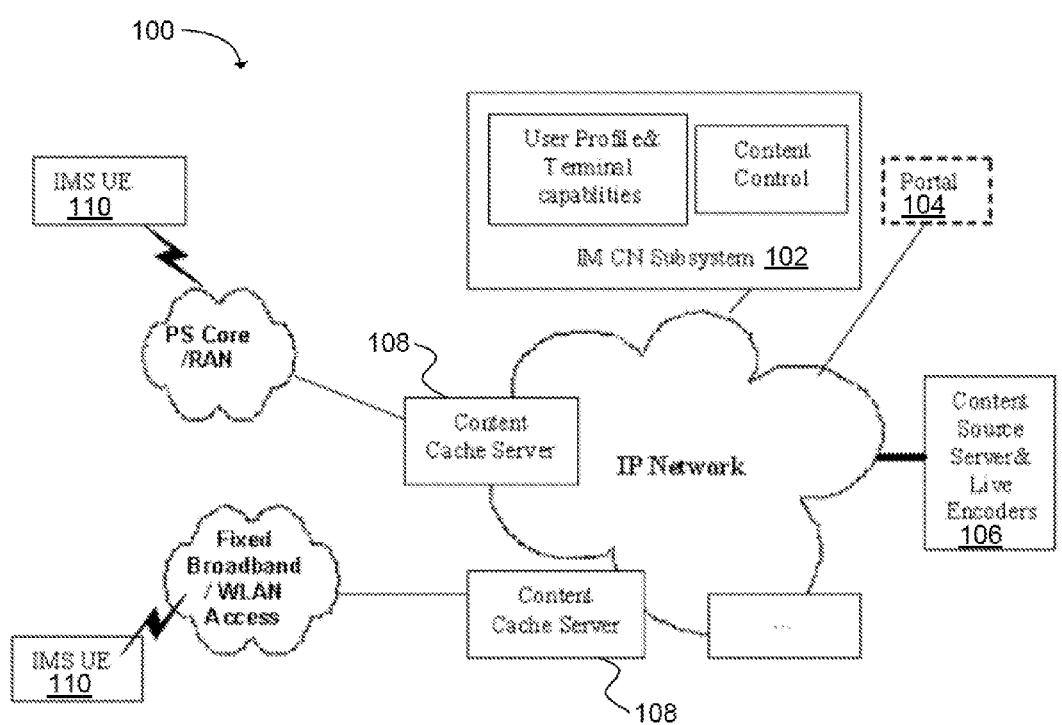
FIG. 1 illustrates a block diagram of an internet protocol (IP) multimedia subsystem (IMS) based peer to peer (P2P) content distribution system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

Dynamic adaptive streaming over HTTP (DASH) is a multimedia streaming technology where a multimedia file can be partitioned into one or more segments and delivered to a client using HTTP. A DASH client can receive multimedia content by downloading the segments through a series of HTTP request-response transactions. DASH can provide the ability to dynamically switch between different representations, including bit rate or encoding type, of the media content as the available bandwidth changes. Thus, DASH can allow for fast adaptation to changing network and wireless link conditions, user preferences and device capabilities, such as display resolution, the type of central processing unit (CPU) employed, or memory resources available. The dynamic adaptation of DASH can provide a better quality of experience (QoE) for a user, with shorter startup delays and fewer rebuffering events.

The internet protocol (IP) multimedia subsystem (IMS) or IP multimedia core network subsystem (IM CN) is an architectural framework in 3GPP for delivering IP multimedia services. The IP multimedia core network subsystem can be a collection of different core network and access network functions, linked by standardized interfaces which, grouped together, can form one IMS administrative network.

P2P Content Distribution

The use of peer to peer (P2P) communication can provide significant improvements in delivering streaming media to mobile devices. With the explosive growth of media content consumption, the number of media servers to provide streaming services is required to be increased almost linearly with the number of users. In addition, centralized streaming media servers have considerable demands towards the bandwidth of the backbone IP network. More and more edge servers are deployed close to UEs to provide a desired quality of service (QoS) and/or Quality of Experience (QoE).

Peer-to-peer technology can be used between edge servers and UEs to reduce the number of edge servers that are needed to be deployed close to UEs. If the capabilities of a mobile device permit, the UE can offer spare uplink bandwidth and storage space for streaming data. The streaming data can be uploaded to other requested destinations.

In one embodiment, IMS can be a fixed and mobile convergence core network to provide multimedia services. In addition, IMS can provide an infrastructure for user authentication, registration, service discovery, and multimedia session control. FIG. 1 provides an overview of an IMS based P2P content distribution system 100. In one embodiment, an IMS configured UE 110 can initiate content distribution via a fixed or mobile access network to the IMS CN subsystem 102. An IMS UE can be redirected to the portal 104, which can offer content indexing, browsing and searching functionalities. The content can be stored on content servers, such as a network server 106 of a UE. Content cache servers 108 can be deployed close to the users to accelerate content distribution.

A user profile can be stored in the IMS 100 and capabilities (i.e. processing capabilities, screen size, 3GPP capabilities) of a terminal such as a UE 110 can be stored in a P2P application service with the user's preferences. The UE capabilities can be used to decide whether or not a UE, or a client operating on a UE, is capable of receiving the requested content. Content control can be used to control how the content is distributed in the network and where a UE can get the requested content.

To ease the integration with the Internet, IMS can use session initiation protocol (SIP). Several roles of SIP servers or proxies, which can collectively be called a call session control function (CSCF), can be used to process SIP signaling packets in the IMS. Fixed access (e.g., digital subscriber line (DSL), cable modems, or Ethernet), mobile access (e.g., W-CDMA, CDMA2000, GSM, or GPRS) and wireless access (e.g., WLAN (IEEE 802.11-2012) or WWAN (3GPP LTE Rel. 10, 11 or IEEE 802.1 m6-2011)) can be supported by the IMS. Other phone systems like plain old telephone (POTS—analog telephones) and non IMS-compatible Voice over IP (VoIP) systems can be supported through gateways. DASH-formatted content can be delivered over an IMS or IM CN network in a multicast frame, such as a multimedia broadcast multicast services (MBMS) download delivery, or in a unicast frame, such as an HTTP-based delivery.

In one embodiment, a content delivery session including DASH content can be delivered using an MBMS download method, then switched to an HTTP-based delivery method in the middle of the session (mid session). Alternatively, the content delivery session can be delivered using the HTTP-based delivery method, then switched to the MBMS download method mid session. Switching in an IMS-based network between the MBMS download method and HTTP-based delivery method during the transmission of DASH-formatted content to the user can be desirable.

A summary of MBMS and HTTP based delivery follows. The summary is not intended to be complete. A more complete explanation of packet switched streaming services (PSS) based on the real-time streaming protocol (RTSP) for unicast streaming of on-demand or live content is provided in 3GPP technical specification (TS) 26.234. HTTP-based streaming services, including progressive download and DASH are described in 3GPP TS 26.247. 3GPP-based MBMS specification TS 26.346 specifies streaming and download techniques for multicast/broadcast content distribution. IMS-based extensions of the DASH/PSS/MBMS user services and associated streaming and download procedures are provided in 3GPP TS 26.237.

MBMS download delivery can be an alternative service for offloading HTTP-based unicast download delivery. Benefits of using an MBMS download delivery can include enabling support for non-real-time service types, enabling the provision of contents that complement MBMS streaming services, and leveraging the increasing storage capacity on mobile devices. The DASH segment format, although mainly intended for unicast transport with HTTP, can be agnostic of the delivery environment being unicast or multicast. DASH-formatted content can be transmitted using MBMS download delivery with a file delivery over unidirectional transport (FLUTE) protocol.

FLUTE can be a protocol for the unidirectional delivery of files over the Internet, which can be particularly suited to multicast networks. FLUTE can build on asynchronous layered coding (ALC), a base protocol designed for massively scalable multicast distribution. FLUTE can provide instantiation of a layered coding transport (LCT) building block. The ALC protocol can combine the LCT building block, a congestion control (CC) building block and a forward error correction (FEC) building block to provide congestion controlled reliable asynchronous delivery. The LCT can provide transport level support for reliable content delivery and stream delivery protocols. Streaming data or downloads can be encapsulated in real-time transport protocol (RTP) and transported using the FLUTE protocol when delivering over MBMS bearers. RTP can be used in communication and entertainment systems that involve streaming media, such as telephony, video teleconference applications, television services and web-based push-to-talk features.

Three functional layers can be used for the delivery of MBMS-based services, which can include a bearers layer, a delivery method layer, and a user service layer or application layer. The bearers layer can provide a mechanism by which IP data can be transported. Bearers can include a unicast bearer or a MBMS bearer. The delivery layer can provide functionality such as security and key distribution, reliability control by means of forward-error-correction (FEC) techniques and associated delivery procedures such as file-repair, delivery verification. Delivery methods can include download and streaming. The MBMS user service can enable applications. A user service can include multimedia messaging service or packet-switched streaming service (PSS).

DASH-based adaptive streaming over HTTP can be different from real time streaming protocol (RTSP)-based adaptive streaming. RTSP can be a network control protocol used in entertainment and communications systems to control streaming media servers. The RTSP protocol can be used for establishing and controlling media sessions between end points in a push-based and server controlled fashion, while DASH-based adaptive streaming can be pull-based and client-controlled. Clients of media servers can issue videocassette recorder (VCR)-like commands, such as play and pause, to facilitate real-time control of playback of media files from the server. While similar in some ways to HTTP, RTSP can define control sequences useful in controlling multimedia playback. While HTTP can be stateless, RTSP can have a state or an identifier used when needed to track concurrent sessions.

Prior to the use of DASH-based adaptive streaming techniques, progressive download methods were also available for media delivery from standard HTTP web servers. Disadvantages of HTTP-based progressive download can include that bandwidth may be wasted if a user decides to stop watching the content after progressive download has started (e.g., switching to another content), the download is not really bitrate adaptive, or the download does not support live media services. DASH technology can address the weaknesses of RTP/RTSP-based streaming and HTTP-based progressive download.

In DASH, the media presentation description (MPD) metadata file can provide information on the structure and different versions of the media content representations stored in the server, including different bitrates, frame rates, resolutions, codec types, and similar information. The MPD information can be used to ensure mapping of segments into media presentation timeline for switching and synchronizing the presentation with other representations. In addition, DASH can also specify the segment formats, such as information on the initialization and media segments for a media engine. The media engine can view the initialization segment to determine a container format and media timing information.

Examples of DASH technologies can include Microsoft IIS Smooth Streaming, Apple HTTP Live Streaming, and Adobe HTTP Dynamic Streaming. DASH technology has also been standardized by organizations, such as the third generation partnership project (3GPP), moving picture experts group (MPEG), and open IPTV forum (OIPF).

Switching Between MBMS and DASH

To provide a consistent user experience for an entire adaptive streaming session or content delivery session, a mobile device can switch between an HTTP-based delivery and a MBMS download depending on certain circumstances. For instance, switching circumstances can include changing between a packet-switch streaming service (PSS) and MBMS coverage, or triggered by a specific user action, such as trick play. Trick play or trick modes can include fast forward, fast rewind, slow motion, slow rewind, pause and resume. Trick play or trick modes can be based on a processing of received segments by a mobile device. The received (or downloaded) segments can be provided to the decoder at a speed lower or higher than the segment's nominal timeline (the internal timestamps) may mandate, thus producing a desired trick effect on the screen or media presentation.

A mobile device may have already established MBMS download or HTTP-based DASH-formatted content delivery session. The mobile device may be capable of switching to the other delivery method, such as an HTTP-based delivery if receiving a MBMS download, or switching to a MBMS download if receiving an HTTP-based delivery. Examples of some relevant switching events for switching from MBMS download to HTTP-based delivery method can be provided without changing a channel and with changing a channel. For example, without a channel change, a user may be viewing an MBMS user service and move out of MBMS coverage. Or the user may initiate trick play mode action facilitating a switch to an HTTP-based delivery. In another example, the content may only be available on packet switch streaming (PSS)/DASH with a change of a channel. Examples of some relevant switching events for switching from HTTP-based delivery to MBMS download can be provided without changing a channel and with changing a channel. For example, without a channel change, the user may return back from trick play mode to a normal MBMS user service. In another example, the content may only be available on MBMS with a change of a channel.

Figure 2:
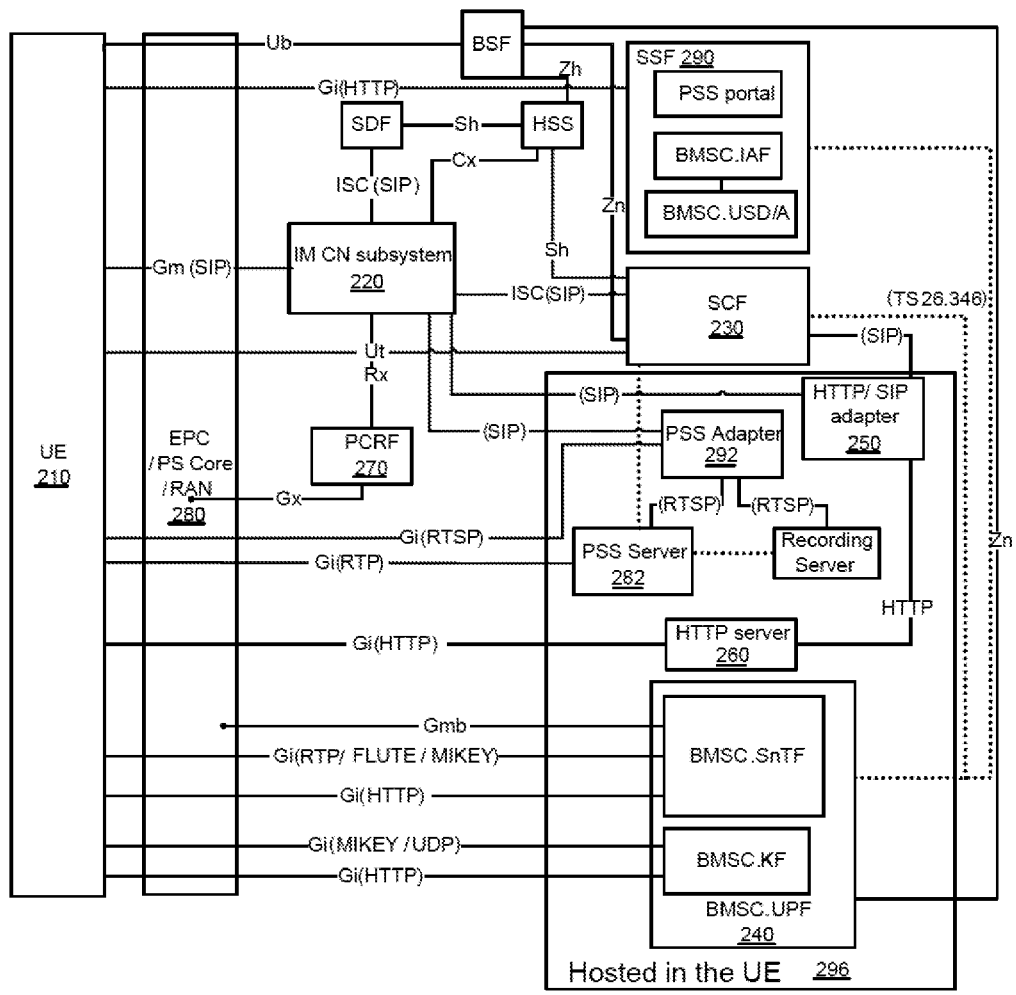
FIG. 2 illustrates a block diagram of an IMS based packet-switched streaming services (PSS) and MBMS functional architecture for P2P in accordance with an example.

FIG. 2 provides an example block illustration of IMS based packet-switched streaming services (PSS) and MBMS functional architecture. In this example embodiment, portions of the architecture can be hosted in a mobile device, such as a UE, to enable peer to peer (P2P) streaming and download delivery services. To provide P2P streaming and download delivery services, the UE can host one or more of a PSS server 282, a PSS adapter 292, an HTTP server 260, an HTTP/SIP adapter 250, or a broadcast multicast service center (BMSC) user plane sub-functions (UPF) (BMSC.UPF) 240. This allows P2P streaming and download delivery services to switch between MBMS and DASH delivery.

The UE 210 can contain the generic bootstrapping architecture (GBA), IMS, PSS, and MBMS clients, which can perform service discovery and selection, handle service initiation, modification and termination, and/or receive and present the content to the user.

The UE can also host the HTTP/SIP adapter. The HTTP/SIP adapter function correlates a SIP session with HTTP incoming requests. The UE can also host the HTTP server. The function of the HTTP server is described in 3GPP TS 26.234 (e.g. version 11.0.0).

The SCF 230 can provide service logic and functions to support the execution of such service logic. The SCF can provide service authorization during session initiation and session modification, which can include checking the PSS and the MBMS user's service subscription in order to allow or deny access to the service. The SCF can select the relevant PSS and MBMS media functions. For HTTP-based delivery, the SCF can act as a proxy or back-to-back user agent (B2BUA). For MBMS, the SCF can act as a terminating user agent (UA).

The HTTP/SIP adapter 250 can correlate a SIP session with HTTP incoming requests. The HTTP server 260 can provide the DASH formatted content for the HTTP-based delivery. The Policy and Charging Rules Function (PCRF) 270 module can control the charging and the establishment of resources in the RAN and PS core network 280. The PCRF is specified in 3GPP TS 23.203 (e.g. ver. 11.0.0).

The SSF 290 module can provide a list of available PSS (including HTTP-based DASH) and MBMS user services and relevant user service description information. The SSF module can be personalized to the client's identity. The PSS adapter 292 can performs bi-directional protocol translation between SIP and RTSP to offer control of PSS servers. The service selection function (SSF) module can provide a list of available PSS (including HTTP-based DASH) and MBMS User Services and relevant user service description information. It can be personalized to the client's identity.

Figure 3:
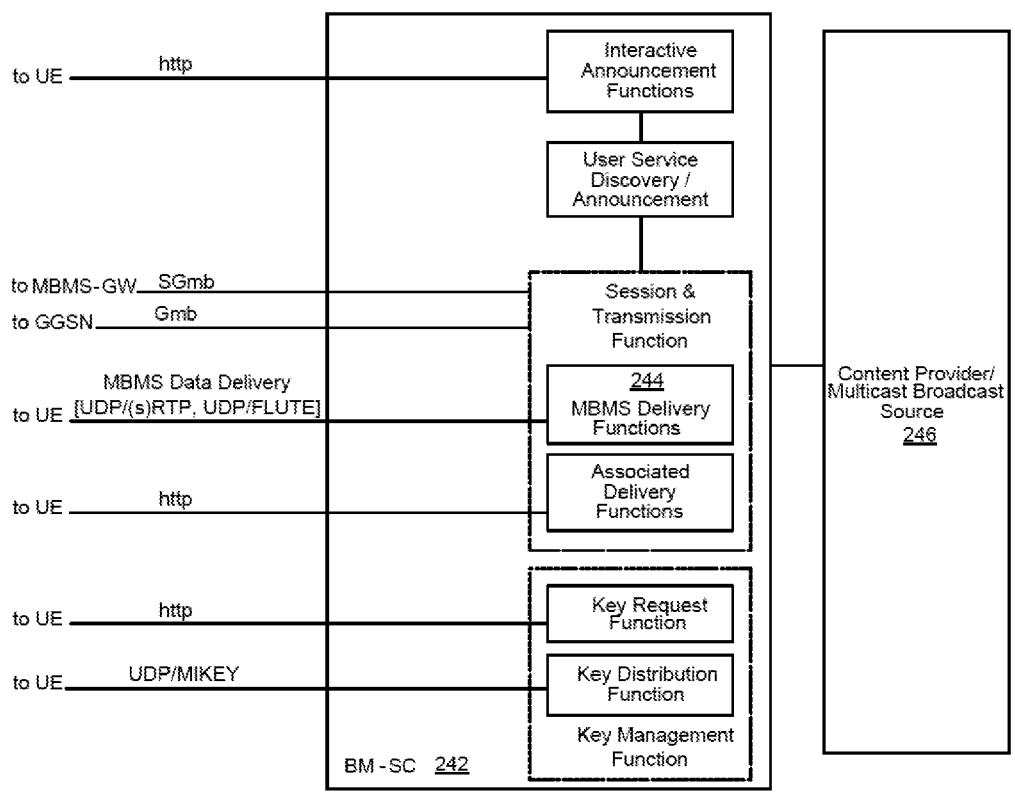
FIG. 3 illustrates a block diagram of a broadcast multicast service center (BMSC) user plane sub-functions (UPF) (BM-SC.UPF) in accordance with an example.

The BMSC.UPF 240 can include broadcast multicast service center (BMSC) user plane sub-functions (UPF). The BMSC.UPF can provide the DASH formatted content for the MBMS download. The BMSC.UPF or BM-SC.UPF can be in communication with and/or control a content provider/multicast broadcast source 246. The BM-SC can provide the MBMS delivery functions 244. The UE can host the BMS-C.UPF. The BMSC.UPF contains all BMSC user plane sub-functions UPF. FIG. 3 illustrates the BMSC sub-functional architecture and associated interfaces between the UE and BMSC. The sub-functional architecture is described in 3GPP TS 26.346 (e.g. Ver. 11.0.0).

In one embodiment, the MBMS download delivery can be previously initiated and the UE can be receiving DASH-formatted content from the BMSC.UPF hosted in another UE (e.g. a host UE 296). The UE can start HTTP streaming by fetching media segments from the HTTP server (hosted in the host UE 296) after obtaining the MPD. This will be discussed more fully below.

MBMS→HTTP Switching

As illustrated in the example block diagram of FIG. 2, in the switch from a P2P MBMS download to the HTTP-based delivery of DASH formatted content in the IMS network, a number of steps are performed. Example implementations of these steps are provided in the proceeding paragraphs, and illustrated in FIGS. 2 and 4. These steps are not intended to be limiting. Nor is the numbering of the steps intended to provide a required order in which the steps are performed.

In a first step, a mobile device, such as a UE 210, can issue a session initiation protocol (SIP) re-invitation to the IM CN Subsystem 220 while the mobile device is receiving an MBMS download in a current content delivery session including DASH content from the host UE 296. The SIP re-invitation can include a SIP Re-INVITE message. The SIP re-invitation can include a session description protocol (SDP) offer and a request uniform resource identifier (URI) for an HTTP server 260 that is hosted on the host UE 296 to provide DASH content via the HTTP-based delivery in the same content delivery session.

The Request-URI is related to the HTTP-based delivery session that the user determines to activate. The Request-URI can be composed of a user and a domain part. The user part can contain a content identifier. The content identifier can be retrieved from a user service description information from a service selection function (SSF) 290 module. Alternatively, the content identifier can be retrieved from service selection information. The domain part is the Service Provider domain name, which can be obtained from the SSF 290. The 'To' header can contain the same URI as in the Request URI. The 'From' header can indicate the public user identity of the user.

The SDF offer can include the media capabilities and policies that are available for the HTTP streaming session. The SDF offer may be derived based on the analysis of the MPD as well as based on parameters received from the SSF module 290 during the service selection procedure or during a procedure for retrieving missing parameters by SIP options. A request to the HTTP server for the MPD may not be necessary as the UE may already have fetched the MPD during MBMS download. If not, then the UE may send an HTTP GET request to the HTTP server in order to download the MPD. In an embodiment, the SDP offer may include previously negotiated media descriptions with the port set to zero. The SDP offer may also include two or more additional media descriptions: including one for a media control channel (i.e., a MPD delivery channel) and one or more for a media delivery channel (i.e. a delivery channel for the unicast streams over HTTP). In another embodiment, the SDP offer for media delivery may be identical to the previous SDP offer that was sent for broadcast in term of codecs and transport protocol. As the HTTP-based delivery runs on top of the transmission control protocol (TCP), whereas FLUTE-based MBMS download delivery runs on top of the user datagram protocol (UDP), the change from MBMS to DASH delivery can be indicated in the SDP.

In a second step, the IM CN subsystem 220 can forward the SIP re-invitation to the SCF module 230.

In a third step, when receiving the SIP modification request, the SCF 230 will determine if the program currently broadcasted has MBMS to HTTP switching support. If MBMS to HTTP switching is not available for the UE 210, the session modification is rejected and the old MBMS session (along with the previous reserved resources) is maintained.

If MBMS to HTTP switching is available for the UE 210, the SCF 230 can act as a back-to-back user agent (B2BUA) to perform the following actions in the third step.

Upon reception of the SIP Re-INVITE from the UE 210, the SCF 230 can check the user rights for the requested content, identify that the request is for HTTP streaming, select an HTTP/SIP adapter 250 in a host UE 296 and forward the SIP request to the HTTP/SIP adapter which is in charge of the HTTP streaming service by changing the "Request-URI" accordingly. When receiving a 301 or 302 response from the HTTP/SIP adapter, the SCF shall not forward this message to the UE 210.

If the Request-URI contains a content identifier in the user part and a domain name in the domain part, the SCF 230 can select a suitable HTTP/SIP adapter 250 and generate a SIP INVITE request to the selected PSS adapter 292. The 'To' header of the SIP INVITE request can contain the same content identifier as in the Request-URI of the SIP modification request received from the UE.

The SCF 230 can send the SIP INVITE request to the HTTP/SIP Adapter 250 with the SDP parameters including the media capabilities and policies available for the HTTP streaming session. The SIP INVITE request may be derived based on the analysis of the MPD. In an embodiment, the SDP offer may include previously negotiated media descriptions with the port set to zero and two or more additional media descriptions: one for a media control channel (i.e., MPD delivery channel) and one or more for a media delivery channel (i.e. delivery channel for the unicast streams over HTTP).

The SCF can then tear down the FLUTE-based MBMS download session between the BMSC.UPF operating on the host UE 296 and the UE 210.

In a fourth step, upon reception of the HTTP streaming session initiation request, the HTTP/SIP adapter 250, operating on the host UE 296, can examine the content identifier present in the user-part of the 'To' header and the media parameters in the SDP and can select an HTTP Server 260 according to the Request URI. The HTTP Server may or may not be operating on the same host UE 296 as the HTTP/SIP adapter. The HTTP/SIP adapter may decide to redirect the request to another HTTP/SIP adapter server operating on another host UE. In this case the HTTP/SIP adapter shall return a 301 response if the content is not managed by this HTTP/SIP adapter or a 302 response for any other reasons (e.g. load balancing). The redirecting HTTP/SIP adapter can indicate one or more destination HTTP/SIP adapter addresses in the contact header.

In a fifth step, the HTTP/SIP adapter 260 can return the SIP 200 OK message to the SCF 230, including a SDP answer. The SDP answer can describe the HTTP streaming session.

In a sixth step, the SCF 230 can forward the SIP 200 OK to the IM CN subsystem 220. The IM CN subsystem can interacts with the policy charging and rules function (PCRF) 270 of the policy charging and control (PCC) architecture, as specified in TS 23.203, to commit the QoS reservation, and then forward the SIP 200 OK to the UE 210.

The proxy call session control function (P-CSCF) is used as the Application Function in the PCC architecture. The PCRF 270 can decide how policy control of the QoS is performed for IMS initiated and controlled PSS and MBMS User Service. The PCRF can use the SDP received from the P-CSCF during session establishment to calculate the proper QoS authorization. The appropriate existing bearers can be used or new required bearers can be allocated. Network initiated bearer control and UE 210 initiated bearer control are possible. When receiving the final SDP, the UE can initiate the establishment of the required bearers unless a network initiated bearer allocation procedure is already ongoing, or the UE has been configured to use network initiated resource control.

In step 7, after receiving the SIP 200 OK, the UE 210 can leave the multicast channel and start downloading DASH-formatted content over HTTP, such that the media segments are delivered to the UE using the reserved QoS.

Figure 4:
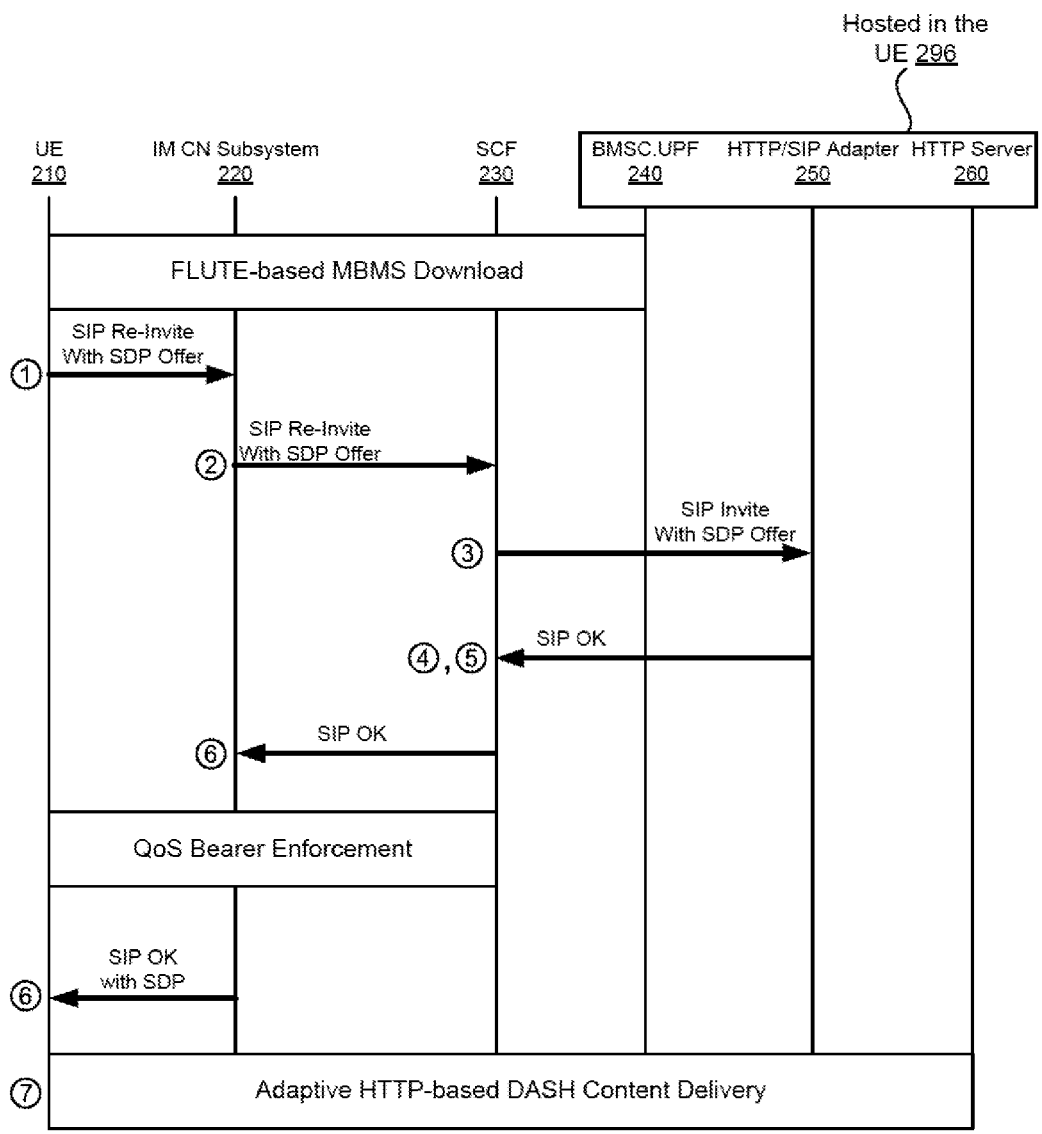
FIG. 4 illustrates a diagram of procedures to switch from multimedia broadcast multicast services (MBMS)download to hyper-text transfer protocol (HTTP) based delivery of Dynamic adaptive streaming over HTTP (DASH) using P2P in accordance with an example.

The example steps, disclosed in the preceding paragraphs, to switch from MBMS download to HTTP-based delivery of DASH content, are depicted in FIG. 4 to show one example communication flow.

Figure 8:
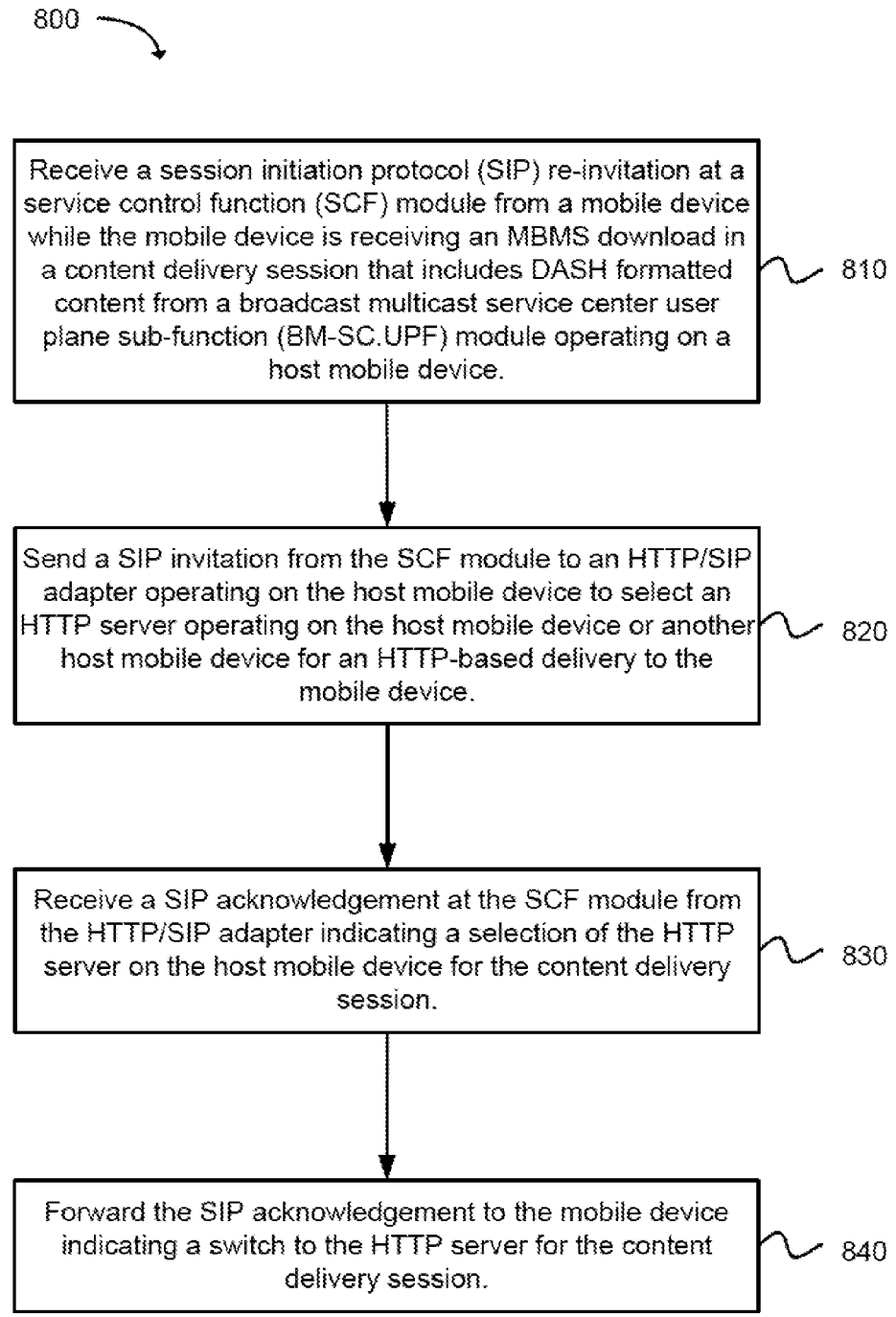
FIG. 8 depicts functionality of a computer circuitry of a service control function (SCF) module operable to switch from an MBMS download to an HTTP-based delivery of DASH formatted content using P2P in accordance with an example.

Another example provides functionality 800 of computer circuitry of a service control function (SCF) module that is operable to switch from a multimedia broadcast multicast services (MBMS) download to a hypertext transfer protocol (HTTP) based delivery of dynamic adaptive streaming over HTTP (DASH) formatted content, as shown in the flow chart in FIG. 8. In addition, the functionality may be implemented as a method or the functionality may be executed as instructions on a machine, where the instructions are included on at least one computer readable medium or one non-transitory machine readable storage medium.

In the example illustrated in FIG. 8, the computer circuitry can be configured to receive a session initiation protocol (SIP) re-invitation at a service control function (SCF) module from a mobile device while the mobile device is receiving an MBMS download in a content delivery session that includes DASH formatted content from a broadcast multicast service center user plane sub-function (BM-SC.UPF) module operating on a host mobile device, as in block 810.

The computer circuitry can be configured to send a SIP invitation from the SCF module to an HTTP/SIP adapter operating on the host mobile device to select an HTTP server operating on the host mobile device or another host mobile device for an HTTP-based delivery to the mobile device, as in block 820. A SIP acknowledgement can be received at the SCF module from the HTTP/SIP adapter indicating a selection of the HTTP server on the host mobile device for the content delivery session, as in block 830. The SIP acknowledgement can be forwarded to the mobile device indicating a switch to the HTTP server for the content delivery session, as in block 840.

In another example, the SIP re-invitation can be received from the mobile device at an internet protocol (IP) multimedia subsystem (IMS) core network (IM CN) subsystem, and the IP CN subsystem is configured to forward the SIP re-invitation to the SCF.

In another example, the computer circuitry can be further configured to send the SIP acknowledgment to the IM CN subsystem to enable a quality of service (QOS) reservation. The IM CN subsystem can forward the SIP acknowledgement to the mobile device indicating the switch to the HTTP server for the content delivery session.

In another example, a session description protocol (SDP) offer and a request-URI can be included in the SIP re-invite message.

In another example, the computer circuitry can be further configured to determine if MBMS to HTTP switching is supported at the mobile device.

In another example, the computer circuitry can be configured to tear down the MBMS content delivery session between a broadcast multicast service center user plane sub-function (BMSC.UPF) module operating at the host mobile device and the mobile device when MBMS to HTTP switching is available at the mobile device.

In another example, the SIP re-invitation can include a SIP Re-INVITE message, the SIP invitation can include a SIP INVITE message, and the SIP acknowledgement can include a SIP 200 OK.

HTTP→MBMS Switching

Figure 5:
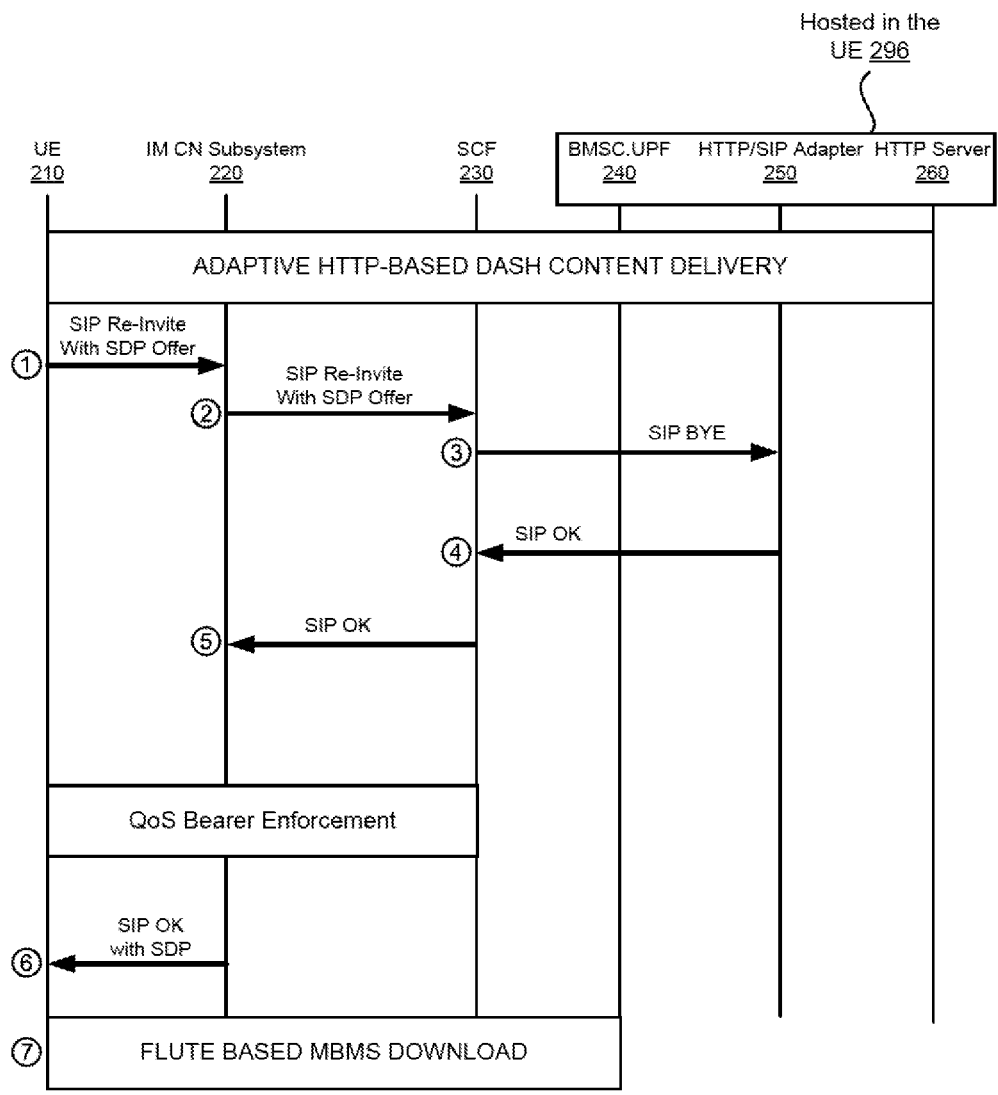
FIG. 5 illustrates a diagram of procedures to switch from HTTP-based delivery to MBMS download delivery of DASH content using P2P in accordance with an example.

FIGS. 2 and 5 provide example illustrations for switching from an HTTP-based delivery to MBMS download of DASH content. In this example illustration, the HTTP-based delivery of DASH content is assumed to have been initiated and the UE 210 is receiving the DASH-formatted content over HTTP from the HTTP server 260 operating on the host UE 296. In the proceeding paragraphs, example steps illustrated in FIG. 5 will be discussed with reference to the IMS illustrated in FIG. 2.

In a first step, in order to switch from HTTP-based delivery to MBMS download reception of DASH content, a session modification request, i.e. a SIP Re-INVITE, can be issued by the UE 210 and sent to the IM CN Subsystem 220 along with an SDP offer. The SIP Re-INVITE is also used to indicate the chosen MBMS download service and FLUTE session information. An SDP offer can be created in accordance with the parameters received during a UE service selection procedure. The SDP offer can also be created in view of media capabilities of the UE 210 and the desired bandwidth available for the MBMS download service.

In an embodiment, the SDP offer for media delivery may be identical to the previous SDP offer provided for HTTP-based delivery in terms of codecs and transport protocol. In another embodiment, the MPD may include information to switch from HTTP-based delivery to MBMS download delivery and the UE 210 may utilize such information when issuing the session modification request, e.g., SIP Re-INVITE, to switch to an MBMS download. The SIP Re-INVITE message can also contain the Request-URI, which can be the well-known PSI (Public Service Identifier) of the MBMS Download Service. The 'To' header can contain the same URI as in the Request-URI and the 'From' header can indicate the public user identity of the user.

In a second step, the IM CN Subsystem 220 can forward the SIP Re-INVITE message to the SCF 230.

In a third step, upon receipt of SIP Re-INVITE request, the SCF 230 can perform service authorization procedures to check the service rights of requested MBMS download service according to the user subscription information.

When receiving the SIP modification request, the SCF 230 can determine if the content currently delivered has HTTP to MBMS switching support. If HTTP to MBMS switching is not available for the UE, the session modification can be rejected and the old HTTP session (along with the previous reserved resources) can be maintained. If HTTP to MBMS switching is available for the UE 210, the SCF can act as a B2BUA, establish a FLUTE-based MBMS download session between the BMSC.UPF 240 operating on the host UE 296 and the UE 210, and send a SIP BYE message to the HTTP/SIP Adapter 250 to terminate the SIP session between them.

In a fourth step, the HTTP/SIP Adapter 250 can then release the HTTP server 260 and send a SIP 200 OK message to the SCF 230.

In a fifth step, once the SIP 200 OK message is received from the HTTP Adapter 250, the SCF 230 can send a SIP 200 OK message to the IM CN Subsystem 220 with an SDP answer.

In a sixth step, the IM CN subsystem 220 can forward the SIP 200 OK message along with the SDP answer to the UE 210. The P-CSCF can be used as the Application Function in the PCC architecture. The PCRF 270 can decide how policy control of the QoS is performed for IMS initiated and controlled by an MBMS User Service. In this MBMS setting, in one embodiment, the PCRF may not initiate the establishment of a specific bearer.

In a seventh step, once the UE 210 receives the SIP 200 OK response, the UE can activate the corresponding MBMS User Service as described in the SDP, in particular the MBMS download service based on FLUTE. MBMS download reception initiation may correspond to the MBMS Broadcast Mode activation procedure or the MBMS Multicast Mode activation procedure. The UE can examine the FLUTE session parameters in the received SDP and receive the MBMS download data accordingly. In the case where a file delivery table (FDT) is unavailable, the UE may get the FDT according to an fdt_address attribute in the SDP Answer. The FDT can contain content description information for the files delivered in the FLUTE session. In the case of an incomplete download, the UE can execute a file repair procedure towards the repair server indicated by a repair-server-address attribute in the SDP Answer. File repair will be discussed more fully in the proceeding paragraphs.

The example procedures to switch from HTTP-based delivery to MBMS download delivery of DASH content are also depicted in FIG. 5.

Figure 9:
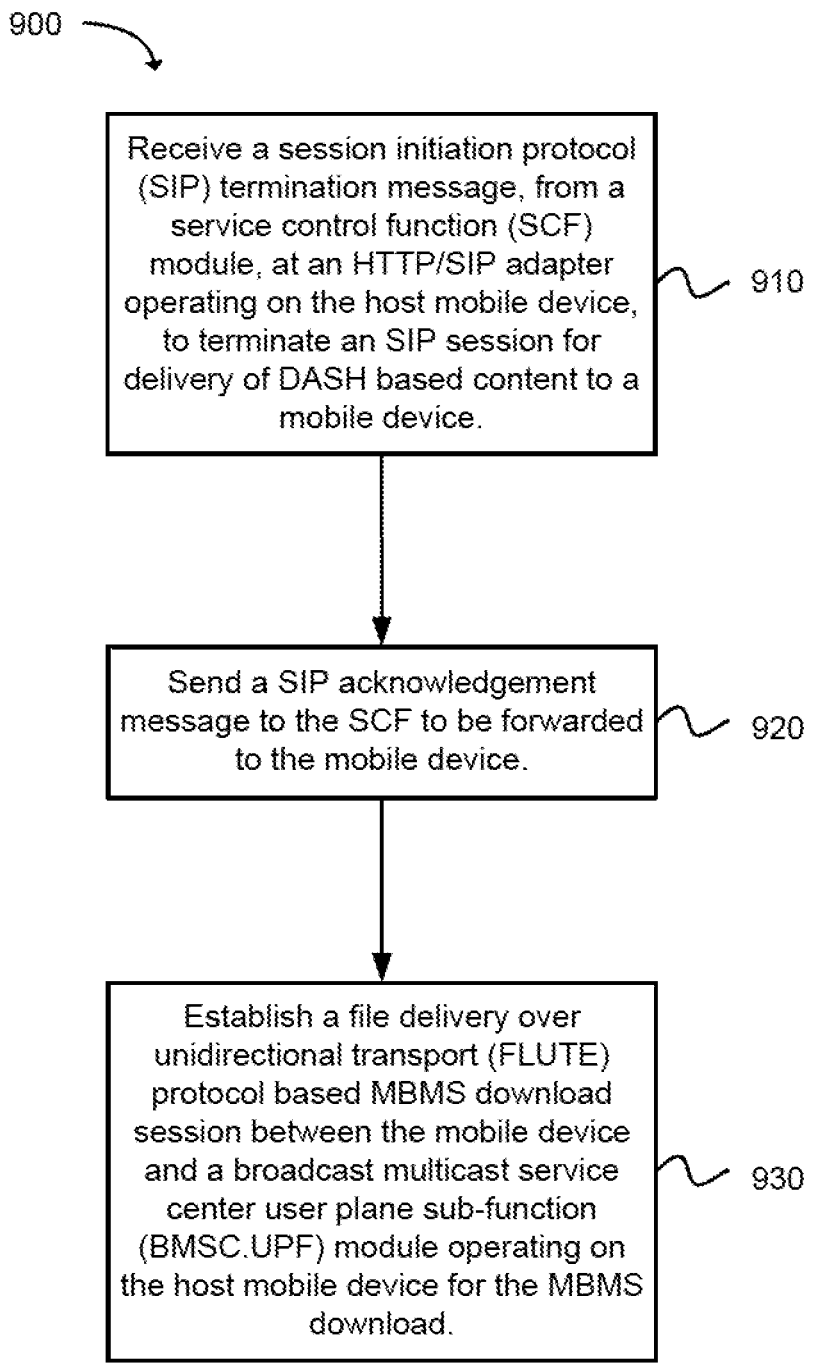
FIG. 9 depicts functionality of computer circuitry of a host mobile device operable to switch from HTTP based delivery of DASH formatted content to a MBMS download to a mobile device using P2P in accordance with an example.

Another example provides functionality 900 of computer circuitry of a host mobile device operable to switch from a hypertext transfer protocol (HTTP) based delivery of dynamic adaptive streaming over HTTP (DASH) formatted content to a multimedia broadcast multicast services (MBMS) download to a mobile device, as shown in the flow chart in FIG. 9. In addition, the functionality may be implemented as a method or the functionality may be executed as instructions on a machine, where the instructions are included on at least one computer readable medium or one non-transitory machine readable storage medium.

In the example illustrated in FIG. 9, the computer circuitry can be configured to receive a session initiation protocol (SIP) termination message, from a service control function (SCF) module, at an HTTP/SIP adapter operating on the host mobile device, to terminate an SIP session for delivery of DASH based content to a mobile device, as in block 910. A SIP acknowledgement message can be sent to the SCF to be forwarded to the mobile device, as in block 920. A file delivery over unidirectional transport (FLUTE) protocol based MBMS download session can be established between the mobile device and a broadcast multicast service center user plane sub-function (BMSC.UPF) module operating on the host mobile device for the MBMS download, as in block 930.

In another example, the SIP termination can include a SIP BYE message and the SIP acknowledgement can include a SIP 200 OK message.

In another example, the host mobile device can communicate with the mobile device via an air interface supporting unicast and multicast delivery of content. The host mobile device can use a protocol selected from the group consisting of a third generation partnership project (3GPP) long term evolution (LTE) standard, Release 8, 9, 10 or 11, and an Institute of Electrical and Electronics Engineers (IEEE) 802.16m-2011 standard.

In another example, the host mobile device can be configured to connect to at least one of a wireless local area network (WLAN), a wireless personal area network (WPAN), and a wireless wide area network (WWAN), and the mobile device includes an antenna, a touch sensitive display screen, a speaker, a microphone, a graphics processor, an application processor, internal memory, a non-volatile memory port, or combinations thereof.

MBMS Download and File Repair Procedures

The file download delivery service over 3GPP's MBMS provides a file repair feature that enables UEs that have not received enough symbols to properly decode a file to request additional symbols. This allows the network to deliver specific symbols to particular UEs over unicast bearers and not load broadcast bearers in the cases where the aggregate load needed to deliver symbols to particular UEs over unicast is moderate.

The file-repair feature relies on file-repair servers in the network to service the repair requests of UEs. The current architecture requires dedicated servers that are specially designed to service the UE requests. This approach can be costly and does not scale well with large deployments.

Figure 6:
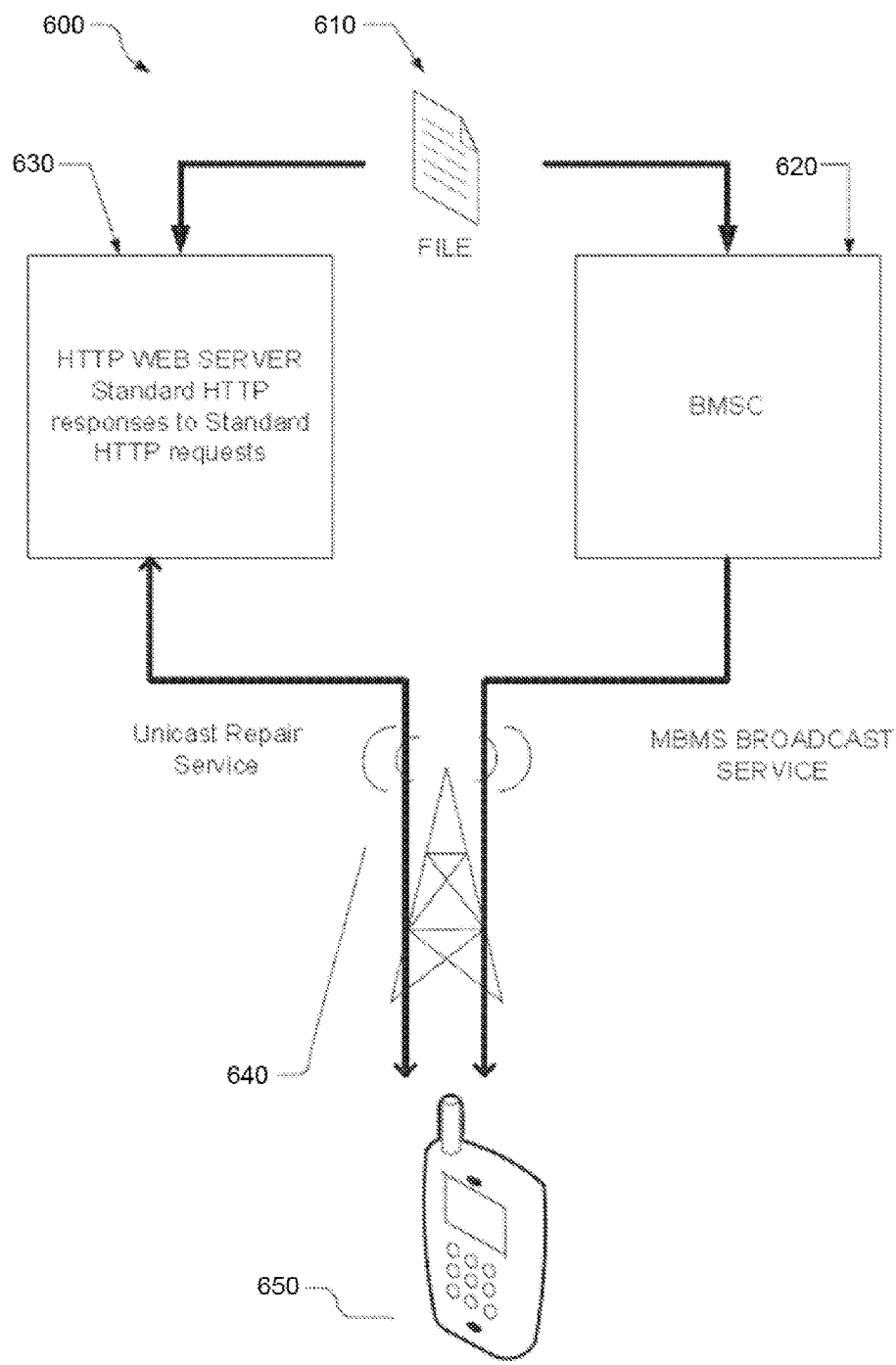
FIG. 6 illustrates an example MBMS file repair procedure using HTTP servers in accordance with an example.

An enhancement to the current file-repair feature that enables the use of conventional HTTP web servers 630 to handle file-repair requests rather than rely on the BMSC 620 is shown in FIG. 6. The ability to switch between MBMS download and HTTP-based delivery enables the enhanced file-repair procedure. The MBMS broadcast service provided by the BMSC 620 can transmit a file or other media 610 to a UE 650 over a cellular network 640. For recovery of source symbols, the UE may contact an HTTP server 630 using standardized HTTP requests/responses. This approach takes advantage of the existing, scalable, standardized and widely-deployed web-based infrastructure for the repair service. In some examples, the system may realize a good performance-complexity tradeoff in terms of server complexity, scalability, caching efficiency, and HTTP request overhead perspectives by intelligently performing repair symbol transmission over the MBMS (repair symbols are redundant symbols sent to the UE that allow the UE to repair the file without actually retransmitting the missing pieces of the file—e.g., symbols produced by an AL-FEC scheme) while allowing for recovery of source symbols by a limited number of HTTP requests. The operator does not have to use specialized file-repair servers and can use the same web servers used to deliver content. Therefore, the BMSC is no longer needed for file repair procedures which are now handled by HTTP servers. The HTTP servers only have to store the content and do not have to spend resources for FEC coding which will allow the system to achieve good cache and network efficiencies with low complexity which will allow the operator to leverage the scalability, reliability, and readily available content provided by using conventional web-servers in the network or Internet.

In one embodiment, the MBMS file repair procedure over IMS-based PSS and MBMS services takes advantage of the ability to switch between MBMS and HTTP delivery services. The MBMS download delivery method can be modified such that the FLUTE session is received by the UE over MBMS bearers from BMSC which broadcast the file, after which the UE establishes a session switch to an HTTP web server in order to retrieve the missing components of the file over HTTP (rather than remaining connected to the BMSC for MBMS file repair service, which is the current procedure).

The 3GPP technical specification TS 26.237 v. 11.0.0 on IMS-based PSS and MBMS services assumes that the UE remains connected to the BMSC during file repair and that the BMSC hosts the file repair service. Therefore, the existing procedures cannot be applied for delivering file repair service to the UE using conventional HTTP web servers.

In the proceeding paragraphs, methods and signaling procedures for MBMS file repair are provided based on the use of conventional HTTP web servers, in the context of IMS-based PSS and MBMS services. In particular, the modifications to the MBMS download delivery procedures are specified, as illustrated in FIG. 2, such that the FLUTE session is received by the UE 210 over MBMS bearers from the BMSC.UPF 240, located on a host UE 296, which broadcasts the file, after which the UE establishes a session switch to an HTTP web server 260, located on the same host UE or a different host UE, in order to retrieve the missing components of the file over HTTP.

The use of P2P communication provides significant advantages in the use of conventional HTTP web servers 630 to handle file-repair requests rather than rely on the BMSC. Particularly, placing the BMSC.UPF 240, the HTTP server 260, and the HTTP/SIP adapter 250 on one or more host UEs allows the recovery information to be made readily available and easily accessible without the need to locate numerous edge servers near user locations.

As illustrated in the example block diagram of FIG. 2, in the switch from a P2P MBMS download to the HTTP-based delivery of file-repair request information, a number of steps are performed. Example implementations of these steps are provided in the proceeding paragraphs, and illustrated in FIGS. 2 and 7. These steps are not intended to be limiting. Nor is the numbering of the steps intended to provide a required order in which the steps are performed.

In a first step, the UE 210 generates an initial SIP INVITE message sent to the IM CN Subsystem 220, indicating the chosen MBMS Download Service. An SDP offer is included in the SIP INVITE message. The IM CN Subsystem forwards the SIP INVITE message and SDP offer to the SCF 230.

The Request-URI in the SIP INVITE request can be the well-known PSI (Public Service Identifier) of the MBMS Download Service. The "To" header can contain the same URI as in the Request-URI. The "From" header can indicate the public user identity of the user.

An SDP offer can be included in the request. The SDP offer can be done in accordance with the parameters received during UE service selection procedure and with media capabilities and required bandwidth available for the MBMS download service.

In a second step, upon receipt of SIP INVITE request, the SCF can examine the SDP parameters in the SDP offer and perform service authorization procedures to check the service rights of requested MBMS download service according to the user subscription information. In case of a successful examination, the SCF can answer with a SIP 200 OK that includes the SDP answer. The SDP answer can contain the fdt_address:uri to indicate the address of the File Delivery Table (FDT), and the repair-server-address:uri to indicate the address of the repair server.

In a third step, once the UE 210 receives the SIP response (SIP 200 OK), the UE can examine the FLUTE session parameters in the received SDP, and receive the MBMS download data accordingly. In case the FDT is unavailable, the UE can get the FDT according to an fdt_address attribute in the SDP Answer. The FDT contains content description information for the files delivered in the FLUTE session.

In a fourth step, in case of an incomplete download, the UE 210 can execute the file repair procedures towards the repair server indicated by a repair-server-address attribute in the SDP Answer from the SCF 230. In order to switch from MBMS download to HTTP-based delivery of the repair service from the web server, a session initiation protocol (SIP) Re-INVITE can be issued by the UE and sent to the IM CN subsystem 220. A session description protocol (SDP) offer and Request-URI pointed to the repair server can be included in the SIP Re-INVITE message to activate the file repair. The IM CN subsystem can forward the SIP Re-INVITE message to the SCF.

The Request-URI is related to the HTTP-based file repair session from the web server that the user wishes to activate. In this example, the web server is located on a host UE. The Request-URI can be composed of a user part and a domain part. The user part can contain the content identifier. The content identifier can be retrieved from user service description information from the service selection function (SSF) module 290. The content identifier can be retrieved from service selection information. The domain part is the Service Provider domain name, obtained from SSF. The 'To' header can contain the repair server address URI. The 'From' header can indicate the public user identity of the user. The content identifier can be retrieved from the service selection information.

An SDP offer can be included in the Re-INVITE request, in accordance with media capabilities and policies available for the file repair session and with the parameters received from the SSF during service selection procedure or during the procedure for retrieving missing parameters by SIP OPTIONS.

In a fifth step, when receiving the SIP modification request, the SCF 230 can determine if the program currently broadcasted has MBMS/FLUTE to HTTP switching support for file repair purposes. If MBMS to HTTP switching is not available for the UE, the session modification can be rejected and the old MBMS session (along with the previous reserved resources) can be maintained.

If MBMS to HTTP switching is available for the UE 210, the SCF 230, acting as a B2BUA, can perform the following actions in the fifth step.

Upon reception of the SIP Re-INVITE from the UE 210, the SCF 230 can check the user rights for the requested content, identify that the request is for MBMS file repair procedures, select an HTTP/SIP adapter 250 operating on a host UE 296, and forward the SIP INVITE request to the HTTP/SIP adapter which is in charge of the file repair service by changing the "Request-URI" accordingly. When receiving a 301 or 302 response from the HTTP/SIP adapter, the SCF may not forward this message to the UE.

If the Request-URI contains a content identifier in the user part and a domain name in the domain part, the SCF 230 can select a suitable HTTP/SIP adapter 250 and generate a SIP INVITE request to the selected HTTP/SIP adapter. The 'To' header of the SIP INVITE request can contain the same content identifier as in the Request-URI of the SIP modification request received from the UE.

The SCF 230, acting as a B2BUA, can send the SIP INVITE request to the HTTP/SIP Adapter with the SDP parameters. The SCF can tear down the FLUTE-based MBMS download session between the BMSC.UPF 240 operating on the host UE 296 and the UE 210.

In a sixth step, upon reception of the MBMS file repair activation request (i.e. the SIP Invite with SDP offer), the HTTP/SIP adapter 250 can examine the content identifier present in the user-part of the 'To' header and the media parameters in the SDP and can select an HTTP server 260 according to the Request URI. The HTTP server may be located on the same host UE as the BMSC.UPF 240 or a different host UE, based on the URI. The HTTP/SIP adapter 250 can send an HTTP POST message to the HTTP server, including the IP address of the UE 210. The HTTP/SIP adapter may decide to redirect the request to another HTTP/SIP adapter server operating on another host UE. In this case the HTTP/SIP adapter can return a 301 response if the content is not managed by this HTTP/SIP adapter or a 302 response for any other reasons (e.g. load balancing). The redirecting HTTP/SIP adapter can indicate one or more destination HTTP/SIP adapter addresses in the Contact header.

In a seventh step, upon reception of the HTTP POST message received from the HTTP/SIP adapter 250, the HTTP server 260 answers to the HTTP/SIP adapter with a HTTP 200 OK response. The HTTP/SIP adapter can return the SIP 200 OK message to the SCF 230, including the SDP answer. The SDP answer can describe the MBMS file repair session, including a download URL of the requested content file. The differences with the SDP answer defined for streaming is the absence of a media line corresponding to the control protocol (RTSP), the indication of a TCP transport and an HTTP-based download method instead of a streaming in "m" line, and the indication of an HTTP URL instead of an RTSP URI.

If the content that the user has selected cannot be found, the HTTP/SIP adapter can reply with an appropriate error code, such as the SIP error code 404 "Not Found" response.

In an eighth step, the SCF 230 can forward the SIP 200 OK message to the IM CN subsystem 220. The IM CN subsystem can forward the SIP 200 OK to the UE.

In a ninth step, after receiving the SIP 200 OK message, the UE 210 can leave the multicast channel and start the MBMS file repair by sending an HTTP GET request to the URL obtained from the SIP 200 OK message. The HTTP server can deliver the content file in the HTTP response to the UE.

Figure 7:
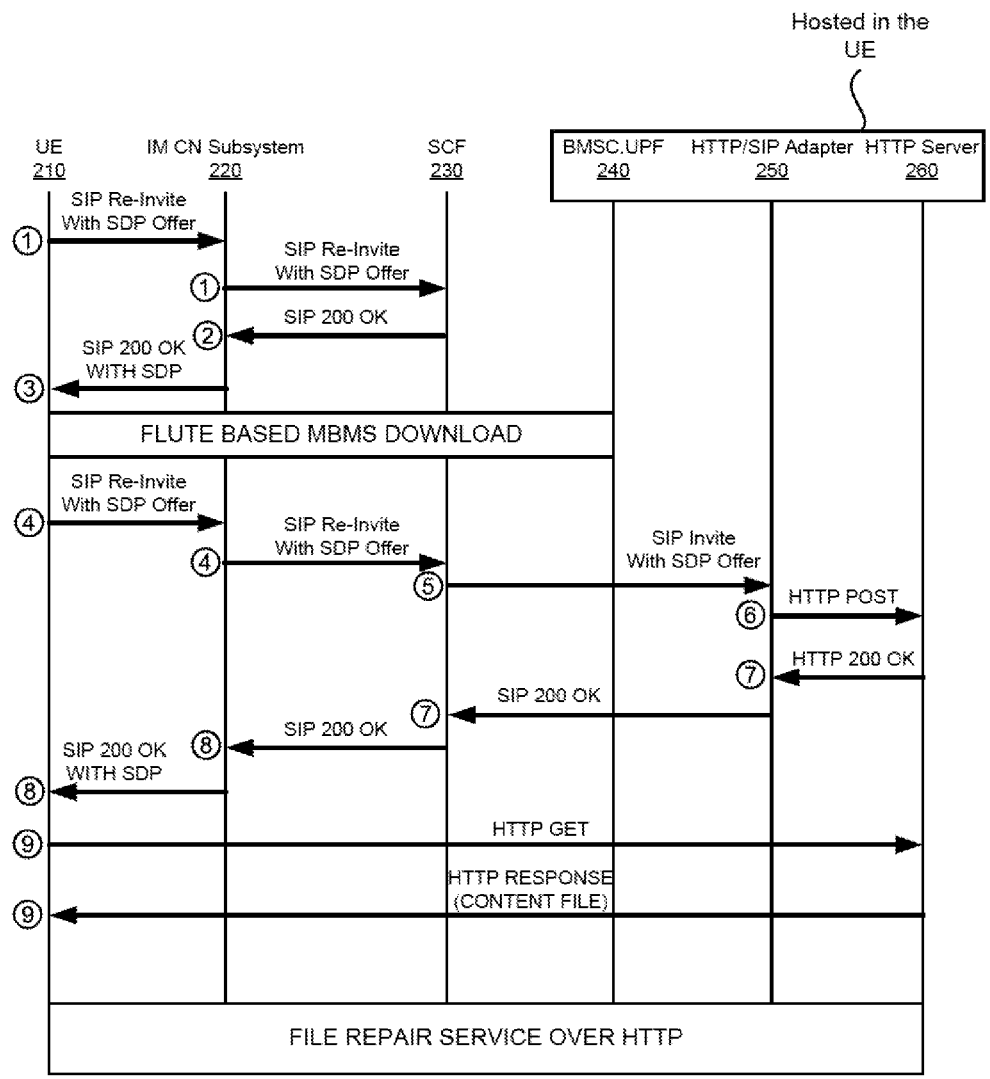
FIG. 7 illustrates a diagram of procedures for MBMS download via BMSC and file repair via an HTTP server using P2P in accordance with an example.

The example procedures to switch from MBMS download to HTTP-based delivery of file repair service from a web server located on a host UE using P2P communication are depicted in FIG. 7.

Another example provides functionality 1000 of computer circuitry of a service control function (SCF) module operable to switch from a multimedia broadcast multicast services (MBMS) download to a hypertext transfer protocol (HTTP) based delivery of content for file repair, as shown in the flow chart in FIG. 9. In addition, the functionality may be implemented as a method or the functionality may be executed as instructions on a machine, where the instructions are included on at least one computer readable medium or one non-transitory machine readable storage medium.

Figure 10:
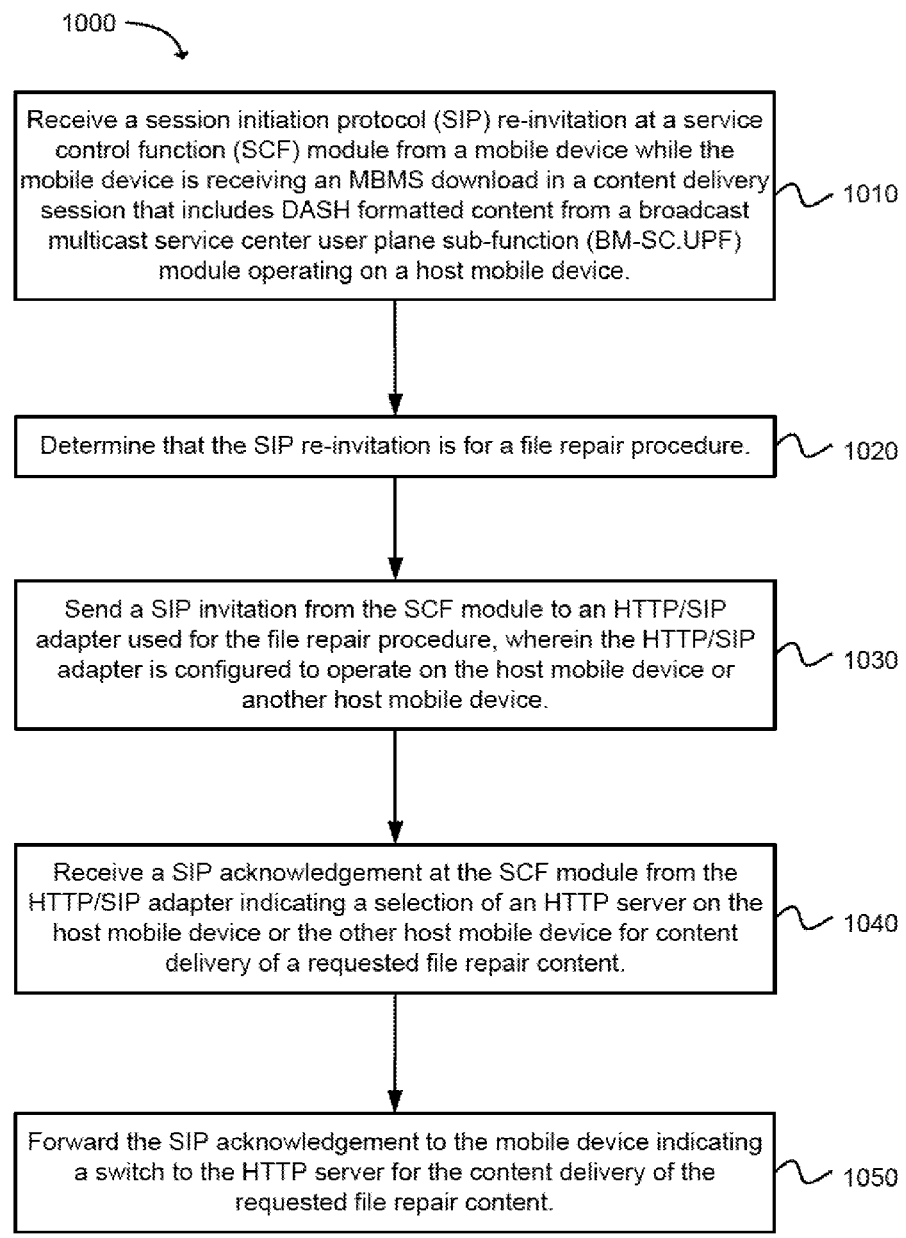
FIG. 10 depicts functionality of computer circuitry of an SCF module operable to switch from an MBMS download to an HTTP based delivery of data for file repair using P2P in accordance with an example.

In the example illustrated in FIG. 10, the computer circuitry is configured to receive a session initiation protocol (SIP) re-invitation at a service control function (SCF) module from a mobile device while the mobile device is receiving an MBMS download in a content delivery session that includes DASH formatted content from a broadcast multicast service center user plane sub-function (BM-SC.UPF) module operating on a host mobile device, as in block 1010. The computer circuitry is further configured to determine that the SIP re-invitation is for a file repair procedure, as in block 1020. A SIP invitation can be sent from the SCF module to an HTTP/SIP adapter used for the file repair procedure, wherein the HTTP/SIP adapter is configured to operate on the host mobile device or another host mobile device, as in block 1030. A SIP acknowledgement can be received at the SCF module from the HTTP/SIP adapter indicating a selection of an HTTP server on the host mobile device or the other host mobile device for content delivery of a requested file repair content, as in block 1040. The SIP acknowledgement can be forwarded to the mobile device indicating a switch to the HTTP server for the content delivery of the requested file repair content, as in block 1050.

In another example, the SIP re-invitation can be received from the mobile device at an internet protocol (IP) multimedia subsystem (IMS) core network (IM CN) subsystem, and the IP CN subsystem can be configured to forward the SIP re-invitation to the SCF.

In another example, the SIP re-invitation can include: a session description protocol (SDP) offer; and a request-uniform resource identifier (URI), and the URI can includes: a content identifier; and a repair server address URI.

In another example, the computer circuitry is further configured to check for user rights for content associated with the content identifier.

In another example, the SIP invitation can include a "To" header containing a same content identifier as in the SIP re-invitation.

In another example, the HTTP/SIP adapter can be configured to: examine the content identifier in the "To" header; select the HTTP server according to the repair server address URI; send an HTTP post message to the HTTP server that includes an internet protocol (IP) address of the mobile device; and determine whether to redirect the request URI to another HTTP/SIP adapter.

In another example, the HTTP server can be configured to send the SIP acknowledgement to the HTTP/SIP adapter.

In another example, the SIP acknowledgement can includes an SDP answer that describes an MBMS file repair session that includes a download URL of the requested file repair content.

In another example, the computer circuitry is further configured to determine if MBMS to HTTP switching is supported at the mobile device.

In another example, the computer circuitry is further configured to tear down the MBMS content delivery session between the broadcast multicast service center user plane sub-function (BMSC.UPF) module operating at the host mobile device and the mobile device when MBMS to HTTP switching is available at the mobile device.

In another example, the SIP re-invitation can include a SIP Re-INVITE message, the SIP invitation can include a SIP INVITE message, and the SIP acknowledgement can include a SIP 200 OK.

It should be noted that the specific air interface (e.g., RAN) characteristics used in the examples are not intended to be limiting. The air interface can be agnostic. Any air interface or combination of multiple air interfaces may be applicable as long as the associated networks are enabled to host the described IMS-based MBMS download delivery functions.

Figure 11:
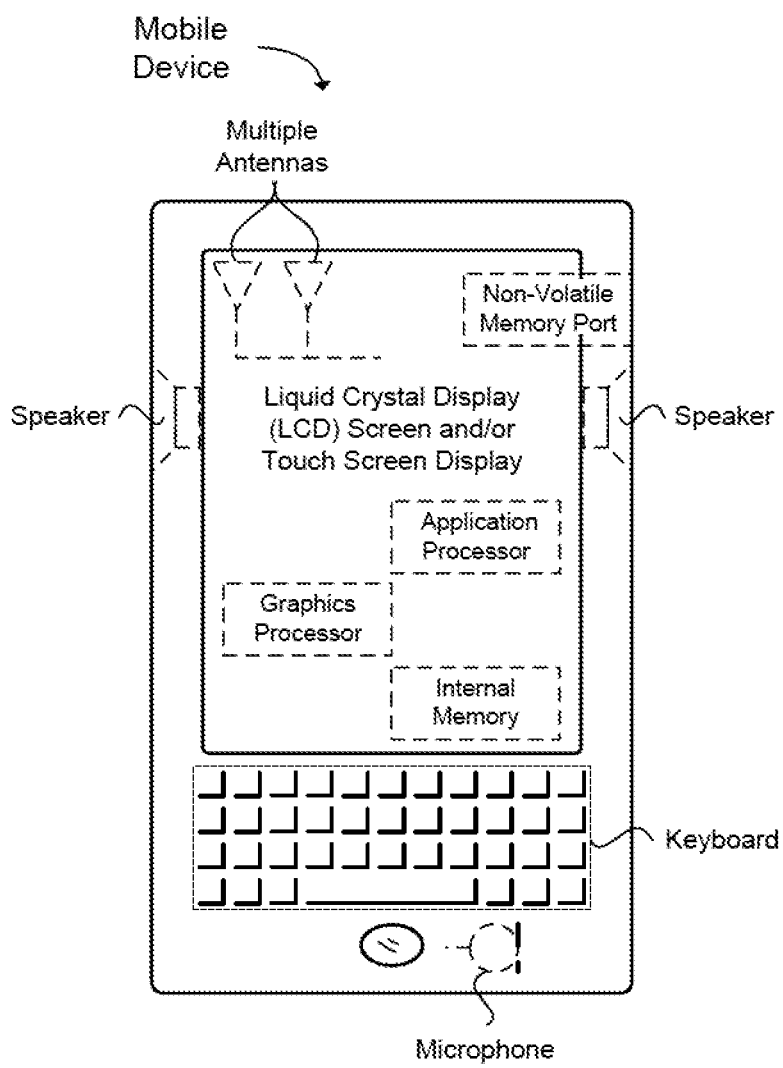
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A service control function (SCF) module operable to switch from a multimedia broadcast multicast services (MBMS) download to a hypertext transfer protocol (HTTP) based delivery of dynamic adaptive streaming over HTTP (DASH) formatted content, the SCF having one or more processors and memory configured to:
receive a session initiation protocol (SIP) re-invitation at a service control function (SCF) module from a mobile device while the mobile device is receiving an MBMS download in a content delivery session that includes DASH formatted content from a broadcast multicast service center user plane sub-function (BM-SC.UPF) module operating on a host wireless mobile user device;
send a SIP invitation from the SCF module to an HTTP/SIP adapter operating on the host wireless mobile user device to select an HTTP server operating on the host wireless mobile user device for an HTTP-based delivery to the mobile device;
receive a SIP acknowledgement at the SCF module from the HTTP/SIP adapter indicating a selection of the HTTP server on the host wireless mobile user device for the content delivery session; and
forward the SIP acknowledgement to the mobile device indicating a switch to the HTTP server for the content delivery session.

2. The one or more processors and memory of claim 1, wherein the SIP re-invitation is received from the mobile device at an internet protocol (IP) multimedia subsystem (IMS) core network (IM CN) subsystem, and the IP CN subsystem is configured to forward the SIP re-invitation to the SCF.

3. The one or more processors and memory of claim 2, wherein the one or more processors and memory are further configured to send the SIP acknowledgment to the IM CN subsystem to enable a quality of service (QOS) reservation, and the IM CN subsystem forwards the SIP acknowledgement to the mobile device indicating the switch to the HTTP server for the content delivery session.

4. The one or more processors and memory of claim 1, wherein a session description protocol (SDP) offer and a request-URI are included in the SIP re-invite message.

5. The one or more processors and memory of claim 1, wherein the one or more processors and memory are further configured to determine if MBMS to HTTP switching is supported at the mobile device.

6. The one or more processors and memory of claim 1, wherein the one or more processors and memory are further configured to tear down the MBMS content delivery session between a broadcast multicast service center user plane sub-function (BMSC.UPF) module operating at the host wireless mobile user device and the mobile device when MBMS to HTTP switching is available at the mobile device.

7. The one or more processors and memory of claim 1, wherein the SIP re-invitation includes a SIP Re-INVITE message, the SIP invitation includes a SIP INVITE message, and the SIP acknowledgement includes a SIP 200 OK.

8. A service control function (SCF) module operable to switch from a multimedia broadcast multicast services (MBMS) download to a hypertext transfer protocol (HTTP) based delivery of content for file repair, the SCF having one or more processors and memory configured to:
receive a session initiation protocol (SIP) re-invitation at a service control function (SCF) module from a mobile device while the mobile device is receiving an MBMS download in a content delivery session that includes DASH formatted content from a broadcast multicast service center user plane sub-function (BM-SC.UPF) module operating on a host wireless mobile user device;
determine that the SIP re-invitation is for a file repair procedure;
send a SIP invitation from the SCF module to an HTTP/SIP adapter used for the file repair procedure, wherein the HTTP/SIP adapter is configured to operate on the host wireless mobile user device;
receive a SIP acknowledgement at the SCF module from the HTTP/SIP adapter indicating a selection of an HTTP server on the host wireless mobile user device for content delivery of a requested file repair content; and forward the SIP acknowledgement to the mobile device indicating a switch to the HTTP server for the content delivery of the requested file repair content.

9. The one or more processors and memory of claim 8, wherein the SIP re-invitation is received from the mobile device at an internet protocol (IP) multimedia subsystem (IMS) core network (IM CN) subsystem, and the IP CN subsystem is configured to forward the SIP re-invitation to the SCF.

10. The one or more processors and memory of claim 8, wherein the SIP re-invitation includes:
a session description protocol (SDP) offer; and
a request-uniform resource identifier (URI), and the URI includes:
a content identifier; and
a repair server address URI.

11. The one or more processors and memory of claim 10, wherein the one or more processors and memory are further configured to check for user rights for content associated with the content identifier.

12. The one or more processors and memory of claim 10, wherein the SIP invitation includes a To header containing a same content identifier as in the SIP re-invitation.

13. The one or more processors and memory of claim 12, wherein the HTTP/SIP adapter is configured to:
examine the content identifier in the To header;
select the HTTP server according to the repair server address URI;
send an HTTP post message to the HTTP server that includes an internet protocol (IP)
address of the mobile device; and
determine whether to redirect the request URI to another HTTP/SIP adapter.

14. The one or more processors and memory of claim 13, wherein the HTTP server is configured to send the SIP acknowledgement to the HTTP/SIP adapter.

15. The one or more processors and memory of claim 8, wherein the SIP acknowledgement includes an SDP answer that describes an MBMS file repair session that includes a download URL of the requested file repair content.

16. The one or more processors and memory of claim 8, wherein the one or more processors and memory are further configured to determine if MBMS to HTTP switching is supported at the mobile device.

17. The one or more processors and memory of claim 8, wherein the one or more processors and memory are further configured to tear down the MBMS content delivery session between the broadcast multicast service center user plane sub-function (BMSC.UPF) module operating at the host wireless mobile user device and the mobile device when MBMS to HTTP switching is available at the mobile device.

18. The one or more processors and memory of claim 8, wherein the SIP re-invitation includes a SIP Re-INVITE message, the SIP invitation includes a SIP INVITE message, and the SIP acknowledgement includes a SIP 200 OK.

* * * * *